（12）United States Patent
Majewski (10) Patent No.: US 8,954,049 B2
(45) Date of Patent: Feb. 10, 2015

(54) METHOD OF OPERATING A MODULE FOR WIRELESS COMMUNICATION OR THE LIKE WIRELESS COMMUNICATION TERMINAL, MODULE FOR WIRELESS COMMUNICATION AND DEVICE OF AN INTEGRATED CIRCUIT CARD AND A SYSTEM OF A COMMUNICATION EQUIPMENT FOR OPERATING THE MODULE

(71) Applicant: Gemalto M2M GmbH, Munich (DE)

(72) Inventor: Frank Majewski, Berlin (DE)

(73) Assignee: Gemalto M2M GmbH, Munich (DE)

( * ) Notice: Subject to any disclaimer, the term of this patent is extended or adjusted under 35 U.S.C. 154(b) by 0 days.

(21) Appl. No.: 13/939,831

(22) Filed: Jul. 11, 2013

(65) Prior Publication Data

US 2014/0018055 A1  Jan. 16, 2014

(30) Foreign Application Priority Data

Jul. 12, 2012 (EP) ..................................... 12176207

(51) Int. Cl.
*H04W 4/00* (2009.01)
*H04W 4/22* (2009.01)

(52) U.S. Cl.
CPC .............. *H04W 4/001* (2013.01); *H04W 4/005* (2013.01); *H04W 4/22* (2013.01)
USPC ........................... 455/418; 455/558; 705/26.1

(58) Field of Classification Search
CPC .................................................... H04W 4/001
USPC ........ 455/418, 558, 412.1; 705/26.1; 709/206
See application file for complete search history.

(56) References Cited

U.S. PATENT DOCUMENTS

| 6,978,157 | B1 | 12/2005 | Amiens |
| 2009/0215491 | A1 | 8/2009 | Hou et al. |
| 2013/0237286 | A1* | 9/2013 | Danis et al. .................... 455/558 |
| 2013/0272251 | A1* | 10/2013 | Schmidt et al. ............... 370/329 |

OTHER PUBLICATIONS

3GPP TS 27.007 V11.3.0; 3rd Generation Partnership Project; Technical Specification Group Core Network and Terminals; AT command set for User Equipment (UE) (Release 11); Jun. 2012; whole document.
ETSI TS 102 223 V11.0.0; Technical Specification; Smart Cards; Card Application Toolkit (CAT) (Release 11); Mar. 2012; whole document.
3GPP TS 31.102 V 11.0.0; 3rd Generation Partnership Project; Technical Specification Group Core Network and Terminals; Characteristics of the Universal Subscriber Identity Module (USIM) application (Release 11); Oct. 2011; whole document.
3GPP TS 11.11 V8.14.0; 3rd Generation Partnership Project; Technical Specification Group Terminals Specification of the Subscriber Identity Module—Mobile Equipment (SIM-ME) interface (Release 1999); Jun. 2007; whole document.
3GPP TS 51.011 V4.15.0; 3rd Generation Partnership Project; Technical Specification Group Core Network and Terminals; Specification of the Subscriber Identity Module-Mobile Equipment (SIM-ME) interface (Release 4); Jun. 2005; whole document.

* cited by examiner

*Primary Examiner* — Phuoc H Doan
(74) *Attorney, Agent, or Firm* — Ware, Fressola, Maguire & Barber LLP (57) ABSTRACT

The invention relates to a method of operating a module 100 or the like wireless communication terminal for wireless communication, wherein in operation the module 100 is in signaling relation to a device 3 of an integrated circuit card, wherein the operation is adapted for signaling between the module 100 and the integrated circuit card device 3 (ICC-device) via an interface system 10, the interface system 10 comprising at least one command interface instance 10.0, 10.1, 10.2, 10.3 adapted for direct command signaling between the module 100 and at least one application 1, 2, and a card application toolkit 80 (CAT) for direct command signaling between the module 100 and the integrated circuit card device 3 (ICC-device).

16 Claims, 4 Drawing Sheets

METHOD OF OPERATING A MODULE FOR WIRELESS COMMUNICATION OR THE LIKE WIRELESS COMMUNICATION TERMINAL, MODULE FOR WIRELESS COMMUNICATION AND DEVICE OF AN INTEGRATED CIRCUIT CARD AND A SYSTEM OF A COMMUNICATION EQUIPMENT FOR OPERATING THE MODULE

CROSS REFERENCE TO RELATED APPLICATION

This application claims priority under 35 U.S.C. §119 to European Patent Application No. 12 176 207.4 filed Jul. 12, 2012, which application is hereby incorporated by reference.

TECHNICAL FIELD

The invention relates to a method of operating a module or the like wireless communication terminal for wireless communication, wherein in operation the module is in signaling relation to a device of an integrated circuit card, wherein said operation is adapted for signaling between the module and the integrated circuit card device via an interface system, said interface system comprising at least one command interface instance adapted for direct command signaling between the module and at least one application and a card application toolkit (CAT) for direct command signaling between the integrated circuit card device (ICC-device) and the module.

Further the invention relates to a module for wireless communication or the like wireless communication terminal wherein the module is adapted for operating in relation to a device of an integrated circuit card. Further the invention relates to a device of an integrated circuit card, in particular an integrated circuit card comprising the device, wherein the device is adapted for operating in relation to a module for wireless communication or the like wireless communication terminal.

Further the invention relates to a system of a communication equipment, in particular a wireless equipment or mobile equipment or an M2M-equipment, for operating a module for wireless communication or the like wireless communication terminal, wherein the system comprises: an equipment appliance; an integrated circuit card device; in particular a device of an universal integrated circuit card (UICC) and/or a SIM-card, in particular implemented in the equipment appliance as a software or hardware card unit; and the module for wireless communication or the like wireless communication terminal; an interface system for signaling between the module; and the integrated circuit card device (ICC-device) when in operation, said interface system comprising: at least one command interface instance adapted for first direct command signaling between the module and at least one application; and a card application toolkit (CAT) for second direct command signaling between the module and the integrated circuit card device (ICC-device).

BACKGROUND OF THE INVENTION

The method and devices as mentioned above are of particular use in the field of wireless communication wherein a communication equipment is provided for wireless communication, in particular in a cellular radio communication network like a cellular radio communication network based on a GSM, 2G, 3G or LTE standard. Such cellular wireless communication network comprises a number of node stations for establishing a communication link between the communication equipment and a node station in a cell of a communication network. The communication equipment usually is identified in the communication network by means of a subscriber identification card usually known as a SIM-Card which has a respective module; the module is adapted for authentication of the subscriber in the net and also has some memory and logic for executing some kind of storage tasks and applications—in the instant application more generally the module also is referred to as an integrated circuit card device. The module for wireless communication or the like wireless communication terminal embraces but is not restricted to a module for a mobile equipment for mobile communication or generally a wireless equipment for communication but also embraces a (machine to machine-) M2M-equipment or the like communication module for solely machine based communication without involvement of a personal user.

In operation the module of the communication equipment is in signaling relation to a device of an integrated circuit card, wherein said operation is for signaling between the module and the integrated circuit card device via an interface system, said interface system comprising: at least one command interface instance adapted for a first direct command signaling between the module and at least one application (e.g. an M2M-application); e.g. by means of an AT-Command.

Also within the communication equipment an operation of the module in relation to a device of an integrated circuit card is necessary to adapt the conditions of communication with the authenticated features which are stored in the integrated circuit card. For instance the integrated circuit or the like logic comprising device of the integrated circuit card securely stores the international mobile subscriber identity (IMSI) or related key used to identify and authenticate subscribers on a mobile telephony device or generally the like communication equipment.

Originally, the SIM Card has been specified in ETSI TS 11.11 and further with regard to 3G standard in ETSI TS 51.011 or further in ETSI TS 31.102. Usually, a device of an integrated circuit card has a microcontroller to establish the logic and typically a RAM and ROM to establish the memory containing an operating system and a personalization of a user of the communication equipment. Further, as indicated it is possible to load applications on the device in use by the subscriber for communication with a handset, a server or the like communication equipment. Within ETSI TS 102 223 with regard to the above mentioned application toolkit—specifically with regard to an integrated circuit card, preferably in form of a SIM-card, referred to as a card application toolkit CAT—mechanisms are described, which allow applications to be executed on the integrated circuit card and thus also to interact and operate with a module or the like terminal connected to the device of the integrated circuit card in a second direct command signaling.

Within operation of the device one of many mechanisms defined by ETSI TS 102 223 in a second direct command signaling between the integrated circuit card device and the module are e.g. 'Proactive UICC' commands—referred to as 'Proactive Commands' or "PACs" within this application documents—, which are sent from the device; namely here a unified integrated circuit card device (UICC-device), to the module or the like terminal. The terminal usually always needs to respond (Terminal Response) to the UICC. Further, according to TS 102 223 "the event download mechanism is used to transfer details of the event to the UICC, when it occurs. Events that the terminal can report to the UICC include incoming calls, location status, access technology, display parameters changed, and availability of the screen for applications." In particular profile downloading provides a mechanism for the terminal to tell the UICC what it is capable of, e.g. which PACs and events are implemented by the terminal. One of many PACs defined by TS 102 223 is the "RUN AT-COMMAND". If provided by the terminal, the SIM may use this PAC to send AT-Commands (e.g. defined by 3GPP TS 27.007 or terminal specific) to the terminal. The terminal itself returns the AT Response within a Terminal Response to the UICC.

A disadvantage of mechanisms of downloading events from the module or the like terminal to the ICC-device, in particular a SIM is, that on the one hand only predefined events can be sent to the ICC-device. On the other hand while an AT interface is implemented for each module and the module is configured to listen to commands via the AT interface, it requires to convert existing mechanisms to those CAT events. It is further more complicated as the module needs to be aware of what type of application is connected via the AT interface. Those further steps are less flexible and error prone.

US 2009/0215491 A1 discloses a method for handling a hands free device by an audio gateway device with a first subscriber identity card and a second subscriber identity card executed by a micro processing unit of a baseband chip. A command is received from the hands free device wherein the hands free device issues the first command to request a status report of the audio gateway device. The status report is provided to the hands free device via a result code which comprises a plurality of integrated status indicators corresponding to statuses of the first subscriber identity card and the second subscriber identity card.

U.S. Pat. No. 6,978,157 B1 discloses a radio communication module of the type cooperating with the SIM Card in the form of at least one first SIM application toolkit dialogue. Said module also cooperates with third item of equipment and comprises means to convert said at least one first dialogue between said SIM Card and said module into a at least one second dialogue between said module and said third item of equipment such that said SIM Card controls said third item of equipment via said module. Said at least one second dialogue is constructed with at least a part of a set of commands and/or unsolicited results written according to a second encoding separate from a first encoding. An unsolicited result is a spontaneous message, which is not a response to a previous command and does not imply a response.

SUMMARY OF THE INVENTION

It is desirable to further improve an internal operation between the module of a communication equipment and the device of an integrated circuit card, in particular an operation between the module of a communication equipment and the device of an integrated circuit card in state of being inserted into the communication equipment; thus internally in the communication equipment starting from the subject mentioned in the introduction.

This is where the invention comes in, the object of which is to provide a method and device of operating a module for wireless communication or the like wireless communication terminal and to provide a respective device, in particular a module, device and system of a communication equipment, of improved kind as compared to the prior art. In particular, the internal operating mode between the module and the device of an integrated circuit card is to be improved. A further object of the invention is to provide a method and device which allow for an improved status report between the module and the device—in particular in a downlink sending from the module to the device—such that nevertheless battery and computing power is spared by the concept of the invention.

The object with regard to the method is achieved by the invention with a method as claimed in claim 1.

The invention relates to a method of operating a module or the like wireless communication terminal for wireless communication, wherein in operation the module is in signaling relation to a device of an integrated circuit card (integrated circuit card device, ICC-device), wherein said operation is adapted for signaling between the module and the integrated circuit card device via an interface system, said interface system comprising:

at least one command interface instance adapted for direct command signaling between the module and at least one application, and a card application toolkit (CAT) for direct command signaling between the module and the integrated circuit card device.

According to the invention an asynchronous event related communication between the module and the integrated circuit card device is provided in a downlink signaling from the module to the integrated circuit card device, wherein for routing said asynchronous event in the downlink signaling from the module to the integrated circuit card device a code is sent from the command interface instance to the integrated circuit card device.

The invention also leads to a module of claim 9 for wireless communication or the like wireless communication terminal.

The invention also leads to a device of claim 10 of an integrated circuit card.

The object with regard to the device is achieved by the invention with a system of a communication equipment as claimed in claim 11. In particular this embraces a wireless equipment or a mobile equipment or an M2M-equipment e.g. but is not restricted to such equipment.

The terminal, in particular, can be understood as the module but nevertheless also embraces any entity of a communication equipment like for instance an equipment appliance (e.g. an equipment appliance of a smartphone) which is adapted to the functionality of the module. The module is preferably provided as an integrated compact unit or the like module pack. The concept further embraces an assembly of a number of entities, which functionally work together such that in coworking relationship of the entities the functionality of the module is adapted. Such kind of assembly of a number of entities can be realized in a system of communication equipment, in particular in an equipment appliance, e.g. a circuit board thereof, of the system.

A typical situation of wireless communication to a network on the one hand and of operating a module in relation to a device of the integrated circuit card on the other hand is established in a system of communication equipment for operating a module for wireless communication or the like wireless communication terminal, wherein the system comprises an equipment appliance, an integrated circuit card device and the module for wireless communication and/or is adapted to receive the integrated circuit card device and the module for wireless communication. The equipment appliance e.g. may comprise an antenna, powering means, man machine interfaces (MMI) and the like entities which allow handling of the communication equipment and which provide interfaces to the network. An internal connection interface for signaling connection between the module and the device of the integrated circuit card is also provided to allow operation of the module in relation to the integrated circuit card device.

For communication in the second direct command signaling a so called application toolkit—more specifically card application toolkit (CAT) as mentioned above—can be used as or linked to an interface module of hardware and/or software implementation which herein is referred to in broad means as an interface instance. Generally, the features mentioned in this application can be implemented by means of a hardware comprising several distinct elements and/or by means of a suitably programmed computer software modules or the like. The module or the like communication terminal internally—i.e. in the communication equipment—is particular preferred but not necessarily connected physically to the device of the integrated circuit card. It is to be understood that the connection also can be of virtual kind, in particular in the case the device of the integrated circuit card is a software module or the like adapted for authentication in the network.

In a simplified manner, in a method and system as mentioned in the introduction for routing an asynchronous event according to the invention said operating is adapted for signaling between the module and the integrated circuit card device (ICC-device) via an interface, wherein the event related communication between the module and ICC-device is based on an unsolicited result code (URC).

Developed configurations of the invention are further outlined in the dependent claims. Thereby the mentioned advantages of the proposed concept are even more improved.

The code is preferably a URC-code. The interface is preferably an AT-interface but also can be another suitable interface like e.g. a JAVA interface. The command signaling in principle can be selected from various kinds of command signaling, however most preferably is an AT interface-command signaling. Another preferred form of command signaling is a JAVA interface command signaling. Preferably an ICC-device is a unified integrated circuit card (UICC), which here is meant to be a smart card containing the UICC-device or the like integrated circuitry comprising chip plus contacts and encapsulation in a card body. Further, in particular a CAT event is preferably defined to enable the UICC to monitor the module's or the like terminal's status. If a predefined status change occurs, the terminal reports an event to the UICC. Preferably the integrated circuit card is inserted as a hardware card unit into the communication appliance of the communication equipment or installed as a software card unit in an appliance memory and/or logic. In particular the communication equipment has a terminal controller signaling connected via the interface to the device, preferably a controller implemented in the appliance and/or the module.

Preferably asynchronous events are those event notifications received by a receiver. They are asynchronously from the receiver perspective. This includes in particular unsolicited result codes (URC) which comply with AT interface standards. It is further suggested that said asynchronous events are definable by the terminal. Those asynchronous events typically have a simple structure as they consist of a text string. The text strings can follow certain rules, e.g. provide agreed end line characters and have a certain internal structure defining type and parameter of an asynchronous event, but this is typically a question of convention between the related parties. Other types of communication protocols where the invention can be used comprise USSD (unstructured supplementary service data), SPI or I2C.

The concept of the invention or a development thereof generally starts from the consideration that e.g. there is currently no mechanism to route asynchronous events (URCs) generated e.g. by a terminal's AT command facility to the SIM. In particular the invention recognized that one crucial part of any e.g. AT command set is not covered by the current TS 102 223: As stated by 3GPP TS 27.007, "so called unsolicited result codes [URCs] Indicate occurrence of an event not directly associated with issuance of a AT command from TE (e.g. call indication RING)". That means that such unsolicited result code happens independent of e.g. an AT command and can therefore not be transported to the SIM via a Terminal Response. Because URCs are not supported by TS 102 223 there is currently no mechanism to route asynchronous events (URCs) generated by the terminal's AT command facility to an ICC-device, in particular a SIM.

Specifically thus an amendment to current card application toolkit implementations defining a mechanism to signal the occurrence of a URC to the ICC-device is described. In the following it is assumed that the ICC-device is implemented as a SIM e.g. URCs are asynchronous events in particular to be used to immediately report terminal status changes to the application or SIM.

The concept of the invention or a development thereof further has considered that, as an alternative, the terminal could repeatedly request (i.e. poll) the terminal's status using a status related e.g. AT read command. This polling scheme is inefficient in terms of CPU, battery and serial interface data transfer load. These are crucial issues in terms of the small and price sensitive device. The current TS 102 223 already defines the mechanism of downloading events from the module or the like terminal to the ICC, in particular SIM. The disadvantage is that on the one hand only predefined events can be sent to the ICC-device, while URCs can freely be defined through the AT command set. On the other hand while AT interface is implemented for each module and the module is configured to provide asynchronous events via e.g. AT interface it requires to convert existing mechanisms to those CAT events. It is further more complicated as the module needs to be aware of what type of application is connected via AT interface. If it is a normal application like a mobile device etc., then URCs can be provided normally. If it is a ICC then the conversion to events within CAT need to be executed. Thus, in summary, a simple way to execute in a subscriber identity module is a polling mechanism, preferably using a separate thread, which requests in regular succession for existing events on the standard application interface of the terminal. However, the concept of the invention or a development thereof recognized, that here the trade-off exists of how often such polling can reasonably be executed having in mind battery and CPU power, and how quick the information provided in asynchronous events need to be available at SIM. For this type of interaction special AT commands, e.g. empty ones can be chosen with the response information bearing the last asynchronous event(s).

The concept of the invention or a development thereof recognized that there are certain possibilities of how said interface allows providing asynchronous events sent from terminal to subscriber identity modules. It is more preferable to use basically existing methods defined in card application toolkit like mentioned events and enhance them that way that URCs are accepted as type of event. In the inventive terminal there are various options how to implement the described enhancement. Typically a terminal is connected to at least another application and a SIM. Both can send e.g. AT commands; now according to the invention both can receive URCs. The question is how the terminal controller manages to send such URCs not only to the application.

The suggested invention allows a subscriber identity module connected to a terminal to be asynchronously informed about events provided to e.g. an AT interface but where no event type is yet defined in a CAT. This preferred embodiment exempts the application running on the SIM from repeatedly polling the terminal's status. Further the terminal does not require converting already existing URCs to a CAT specific event type and therefore managing for asynchronous events which kind of connected devices need to be informed in what format or via what interface. With the present invention for the terminal it is transparent who retrieves reported URCs and what kind of application the receiver is.

Preferably the asynchronous event is generated by means of a module or an appliance, and wherein the asynchronous event is initiated by a command signaling from the module and is provided to said command interface instance.

Preferably the interface system has a number of command interface instances, in particular one or at least a first and a second command interface instance. In particular at least one of the command interface instances is formed by or connected to the card application toolkit, in particular an extended standard card application toolkit (CAT). In a preferred embodiment in a 3G environment a standard card application toolkit can be extended as compared to the standard according to the concept of the invention or a development thereof as described. Similarly in a preferred embodiment in a 2G environment the card application toolkit can be realized as a SIM application toolkit (SAT), which is extended as compared to the standard according to the concept of the invention or a developments thereof.

Preferably, the module or the like wireless communication terminal and/or the device comprises an interface to an integrated circuit card. Advantageously the interface is capable of accepting commands according to a card application interface. Also to provide asynchronous events generated by the terminal using the standard application interface it is capable of accepting commands also based on the unsolicited result code. Thus, particular preferred the interface is an extended card application toolkit.

Preferably the interface system has a number of command interface instances, in particular one or at least a first and a second command interface instance. In particular at least one of the command interface instances is formed by or connected to the card application toolkit, in particular an extended standard card application toolkit (CAT). In a preferred embodiment in a 3G environment a standard card application toolkit can be extended as compared to the standard according to the concept of the invention or a development thereof as described. Similarly in a preferred embodiment in a 2G environment the card application toolkit can be realized as a SIM application toolkit (SAT), which is extended as compared to the standard according to the concept of the invention or a developments thereof.

The command signaling can be an AT-command signaling or the command signaling can be a JAVA-command signaling. Thus, preferably the interface has an AT-, JAVA- or the like command dedicated unit and an URC command dedicated unit. Thus, preferably an URC-command is provided by means of an application toolkit implemented in the interface, in particular in the ICC-device, and/or the module and/or a separate interface instance, in particular by means of an extended card application toolkit (CAT). In particular the application toolkit, in particular an extended card application toolkit, has an AT-command dedicated unit and an URC-event dedicated unit.

As mentioned above the asynchronous event related communication between the module and the ICC-device is preferably based on a code in form of an unsolicited result code (URC). Preferably such unsolicited result code comprises a text string. This text string can further be composed of a certain format, in particular defined by the module. The text string format preferably comprises an identifier which typically relates to an AT command that is used for requesting this URC, and can further hold one or more parameters that depict additional information like temperature, signal qualities etc.

Further with regard to the integrated circuit card device it is particular preferred to provide an interface to the communication device which is configured to accept asynchronous events via said interface whereby the interface is a standard application interface of extended kind as mentioned above.

Preferably the integrated circuit card is inserted as a hardware card unit into the equipment appliance of the communication equipment. Also, additionally or alternatively the integrated circuit card can be installed as a software card unit in a memory and/or logic of the equipment appliance, in particular the module, in particular wherein the communication equipment has a terminal controller signaling connected to the device via the interface system, preferably a terminal controller implemented in the equipment appliance and/or the module.

The concept and developments thereof are applicable for use with all types of ICC-devices, in particular subscriber identity modules like a unified ICC-device (UICCs). In particular the invention is applicable for use with a conventional SIM-device, a solderable SIM-device, machine identification modules based on a SIM device, components of a SIM and/or a software implemented subscriber identity module.

In a preferred first variant of the system the terminal controller is signaling connected commonly via a unique command interface instance of the interface system to the ICC-device and to at least one further application. This variant is particular useful for implementation of a filter means in the interface system. In a particular preferred first variant of development, as is more specifically exemplified with regard to FIG. 2, the terminal controller is uniquely signaling connected via an command interface to the ICC-device and at least one further application in common in the communication equipment, in particular on the equipment appliance.

In a preferred second variant of the system the terminal controller is dedicatedly signaling separately connected to the ICC-device and at least one further application via a number of different interface instances of the interface system to the ICC-device and to at least one further application. This variant is particular easy construed. In a particular preferred second variant of development, as is more specifically exemplified with regard to FIG. 3, the terminal controller is dedicatedly signaling connected to the ICC-device and at least one further application via a number of interface instances separately in the communication equipment, in particular on the equipment appliance.

Preferably the related communication is between a controller of the module and an integrated circuit of the ICC-device wherein the unsolicited result code (URC) is filtered by the interface. In particular the asynchronous event related communication is provided between a terminal controller of the module and an integrated circuit of the ICC-device wherein the code, in particular an unsolicited result code (URC), is filtered by a filter means of the command interface system, in particular an interface instance.

Preferably for filtering by the interface system a filter means is provided in an interface instance, and wherein
  in a first step the ICC-device and the module are assigned relative to each other with a terminal profile; and/or
  in a second step a list of unsolicited result codes (URC) are subscribed to the interface system, in particular stored in the filter means, wherein the list of unsolicited result codes (URC) are adapted to the terminal profile; and/or in a third step a reported unsolicited result code (URC) is probed in compliance with the subscribed list of unsolicited result codes (URC).

In other words it is further suggested that only a subset of available asynchronous events are provided to the subscriber identity module, in particular those where the subscriber identity module has itself registered for, preferably using existing command paths like AT commands. Alternatively a predefined set of asynchronous events is reported to subscriber identity module, provided the terminal is informed about the nature of the subscriber identity module using terminal's standard application interface.

Preferably the event related communication between the module and the ICC-device is in a downlink sending from the module to the ICC-device, in particular to report a module status and/or profile information.

However, also the event related communication between the module and the ICC-device can be in an uplink sending from the ICC-device to the module. In particular the event related communication between a controller of the module and an integrated circuit of the ICC-device is in an uplink sending settable by means of an AT-command request, in particular for setting a terminal profile and/or setup event list and/or for requesting an unsolicited result code list.

In a more elaborate development the standard application interface between SIM and terminal is capable of providing such asynchronous events like URCs. At start-up both parties exchange information about capabilities, preferably using CAT inherent terminal profile. With this the terminal is activated to even send URCs. As terminal initiated communication from terminal to SIM already exists, such communication ways can be exploited to send the URC related information to the SIM. Further it is in particular required that SIM provides information to terminal what kind of URCs are requested. For that already existing AT commands can be used, like activation of battery charge status +CBCHG.

Preferably the asynchronous event is generated by means of a command facility, in particular an AT-command facility, of a module or appliance. In particular the command facility is adapted to generate one or more signaling items selected from the group consisting of: a request for battery charge status, an indication of a ringtone activation, an indication of a temperature status, voltage or field strength status at an antenna of an equipment appliance or other antenna status, an indication of antenna status, an indication of actual call situation, an indication of communication-link-stability or an indication of audio activities, or another indication of applications on the equipment appliance.

Typical URCs that are in preferred embodiments requested are in particular device specific information like temperature monitoring, information about voltage and field strength, a link-stability indicator which in particular indicates detected jamming situation, audio activities, like if loudspeaker or microphone of the terminal are activated, antenna control information and other diagnosis results. In general information of the terminal related to other connected applications are of interest.

One typical use case is in case of an automotive terminal the activation of an emergency call (ECall) through the application (the car). In this case it is preferred that the SIM does not stress the capacity of the terminal through additional activities like network access or others. Therefore it is useful that the activation of an ECall is provided to the SIM via an URC, which therefore can delay planned activities until a certain time has passed or another URC was received informing about the end of the ECall. This development makes it obvious that due to the multitude of possible types of applications a predefined list of events does not appropriately reflect the required flexibility for such event handling.

The method, device and developed configurations thereof as outlined above may be implemented by digital circuits of any preferred kind, whereby the advantages associated with the digital circuits may be obtained. In particular one or more method steps or features of the method can be implemented by one or more means for functionally executing the method step. A single processor or other unit may fulfill the functions of several means recited in the claims—this in particular holds for a user equipment according to the concept of the invention. The concept also leads to a computer program product storable on a storage device and adapted for executing the method when executed on a device.

BRIEF DESCRIPTION OF THE DRAWINGS

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality. Whereas in the following the concept of the invention is exemplifying described by using the example of a CDMA based cellular radio network and terminology assigned thereto, it should nevertheless be understood that the general concept as claimed is not restricted to a specific technology but, also not explicitly mentioned in the example, embraces also other kinds of technologies like GSM, LTE or the like. In the drawing:

DETAILED DESCRIPTION

Figure 1:
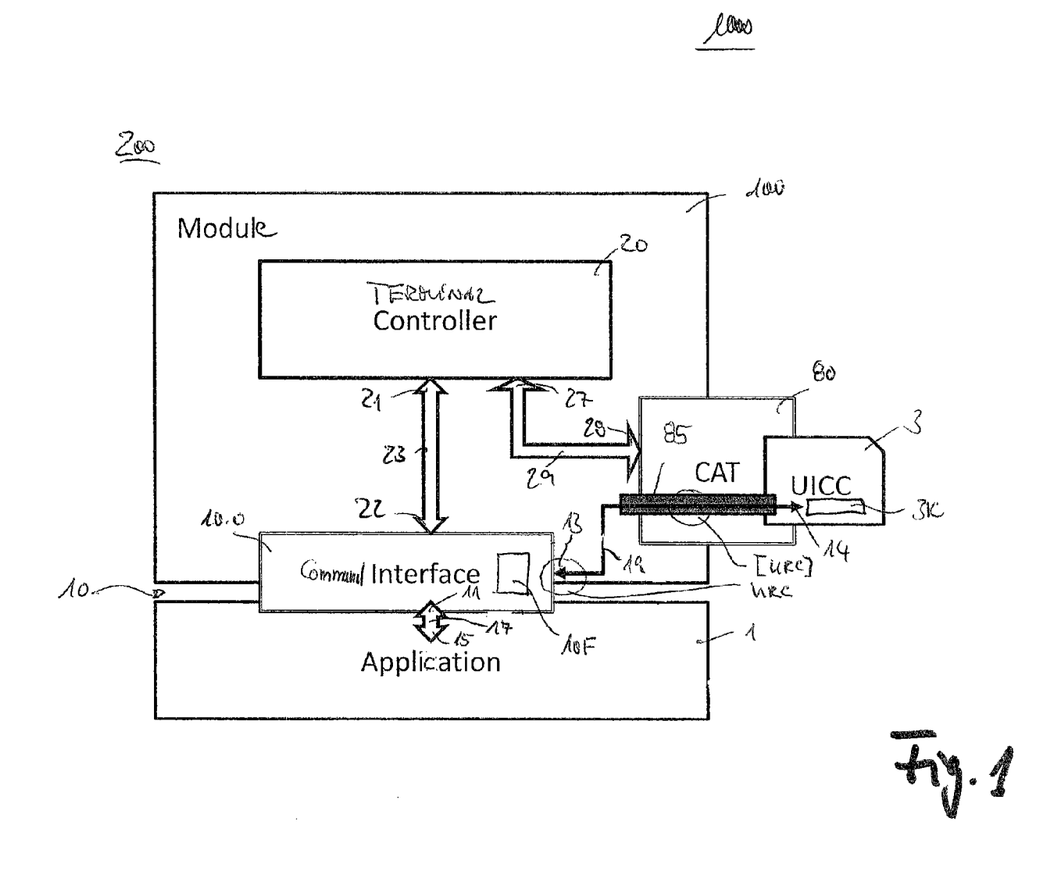
FIG. 1 shows a block diagram of a general exemplifying embodiment of a system of a communication equipment with a module for wireless communication and an integrated circuit card device which are connected via an interface for signaling with regard to a routing of an asynchronous event.

FIG. 1 shows an exemplifying embodiment of a system 1000 of a communication equipment for operating a module 100 for wireless communication to illustrate the basic principle of the concept of the invention wherein for operation of the module 100 signaling between the module 100 and the integrated circuit card device 3 (ICC-device) is provided via an interface system 10. Said interface system 10 comprises: at least one command interface instance 10.0 adapted for first direct command signaling between the module 100 and at least one application 1 via signaling connection 19 and a card application toolkit 80 (CAT) for direct command signaling between the module 100 and the integrated circuit card device 3 (ICC-device) via signaling connection 29. Here an asynchronous event related communication between the module 100 and the ICC-device 3 is provided in a downlink signaling from the module 100 to the ICC-device 3. Therein for routing said asynchronous event in the downlink signaling from the module 100 to the ICC-device 3 a code—here an URC-Code URC, is sent from the command interface instance 10.0—here an AT-interface—to the ICC-device 3. The URC is passed in packed form to the ICC-device 3, wherein the card application toolkit 80 (CAT) provides a code interface 85 for transforming the code URC into a formatted format compatible with the CAT.

The module 100 as mentioned above has a terminal controller 20 for controlling operation of the module and further for signaling between the module 100 and an integrated circuit card device 3 via an interface system 10. The interface system 10 in the instant embodiment is formed with a unique command interface instance 10.0 adapted to interface between the terminal controller 20 and further a first application 1; also one or more further applications like a second application 2 of FIG. 2 can be provided to the command interface instance 10.0. It is to be understood that the command interface can be implemented in the equipment appliance 200 and/or the module 100 irrespective of the depiction of the interface system 10.

The asynchronous event is generated by means of the terminal controller 20 of the module 100 wherein the asynchronous event is initiated by a command signaling from the module 100 and is provided to said command interface instance 10.0. Internally, the module 100—thereby also the terminal controller 20—has a first connection item 21 to connect the terminal controller 20 for signaling to a second connection item 22 to establish a signaling connection 23 to the command interface instance 10.0. Thus the command interface system 10 via the signaling connection 23 is able to receive and transmit command-, code-, information- or the like-signaling between the terminal controller 20 and the command interface 10.

For filtering by the interface system 10 a filter means 10F is provided in the interface instance 10.0. In a first step the ICC-device and the module are assigned relative to each other with a terminal profile. In a second step a plurality of unsolicited result codes (URC) are subscribed to the interface instance 10.0 and stored in the filter means 10F, wherein the plurality of unsolicited result codes (URC) are adapted to the terminal profile. In a third step a reported unsolicited result code (URC) is probed in compliance with the subscribed plurality of unsolicited result codes (URC) on the interface instance 10.0.

For routing said asynchronous event in the downlink signaling from the module 100 to the ICC-device 3 the URC-Code is sent from the command interface instance 10.0 in particular an AT-interface, to the ICC-device 3, and the code is passed in packed form to the ICC-device 3, wherein the card application toolkit 80 (CAT) provides a code interface 85 for transforming the code URC into a formatted format [URC] compatible with the toolkit 80 (CAT).

A first connection item 13 of the interface instance 10.0 is provided to the code interface 85 of the card application toolkit 80. A second connection item 14 of a unique integrated circuit card device 3 then is to establish a signaling connection to the integrated circuit 3IC of the ICC device 3 according to the concept of the invention.

Within operation of the device one of many mechanisms defined by ETSI TS 102 223 in a further signaling connection 29 through first and second connection items 27, 28 a direct command signaling between the integrated circuit card device 3 and the module 100 are e.g. 'Proactive UICC commands'—referred to as 'Proactive Commands' or "PACs" within this application documents—, which are sent from the device, namely here a unified integrated circuit card device (UICC-device) 3 to the module 100 or the like terminal via the signaling connection 29. The terminal usually always needs to respond (Terminal Response) to the UICC. A unified integrated circuit card (UICC) 3 here is meant to be a smart card containing the UICC-device or the like integrated circuitry 3IC comprising chip plus contacts and encapsulation in a card body. Further, in particular a CAT event is defined to enable the UICC to monitor the module's or the like terminal's predefined status values. If a predefined status change occurs, the terminal reports an event to the UICC.

Further, according to TS 102 223 "the event download mechanism is used to transfer details of the event to the UICC, when it occurs. Events that the module 100 or the like terminal can report to the UICC include incoming calls, location status, access technology, display parameters changed, and availability of the screen for applications." In particular terminal profile downloading provides a mechanism for the terminal to tell the UICC what it is capable of, e.g. which PACs and events are implemented by the terminal. One of many PACs defined by TS 102 223 is the "RUN AT-COMMAND". If provided by the terminal, the SIM may use this PAC to send AT-Commands (e.g. defined by 3GPP TS 27.007 and/or terminal specific) to the terminal. The terminal itself returns the AT Response within a Terminal Response to the UICC.

Thus, the current TS 102 223 already defines mechanisms of downloading events from the module 100 or the like terminal to the ICC, in particular a SIM. A disadvantage is, that on the one hand only predefined events can be sent to the UICC. On the other hand while an AT interface is implemented for each module and the module is configured to listen to commands via the AT interface, it requires to convert existing mechanisms to those CAT events. It is further more complicated as the module needs to be aware of what type of application is connected via the AT interface. Those further steps are less flexible and error prone as compared to the signaling connection 19 to the integrated circuit 3IC of the ICC device 3 according to the concept of the invention.

Figure 2:
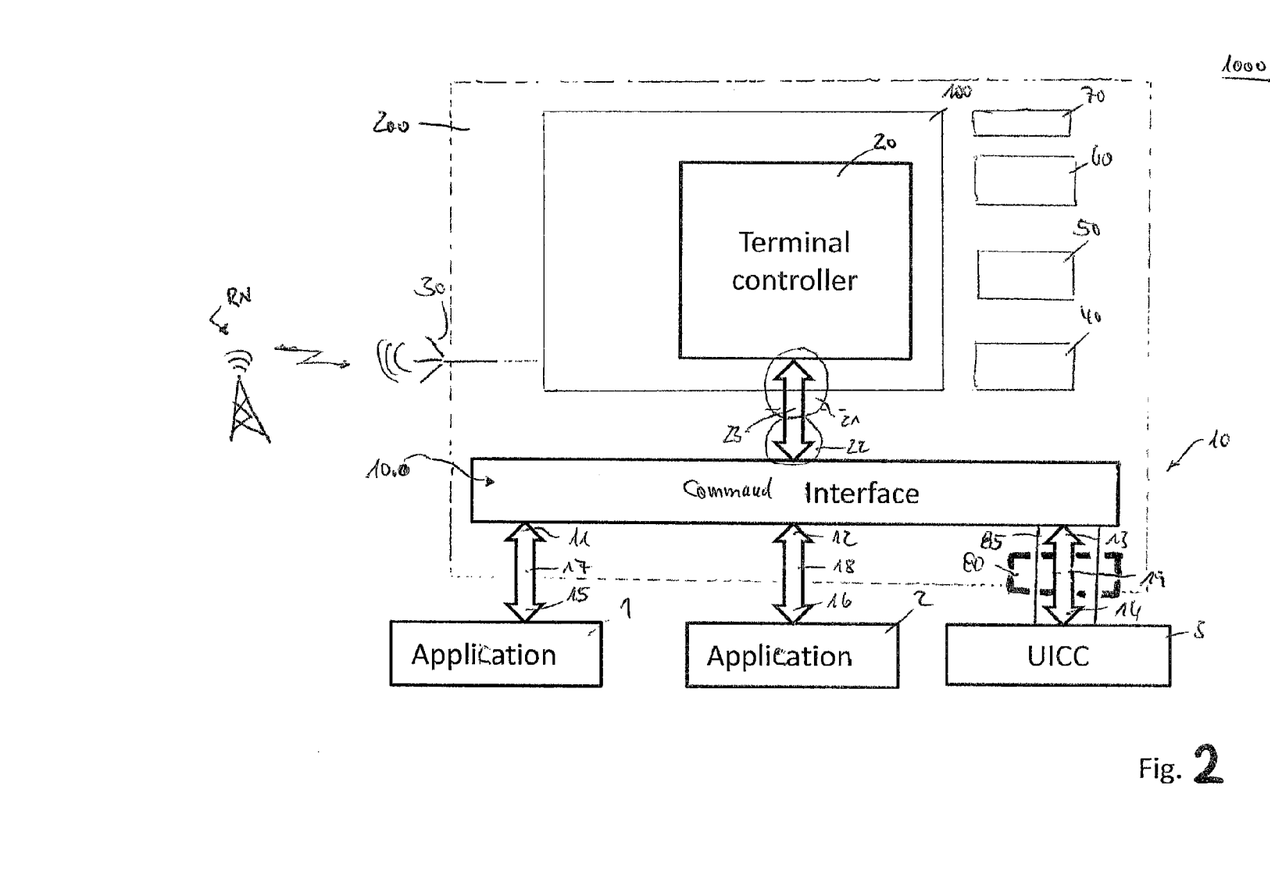
FIG. 2 shows a block diagram of a similar preferred first variant embodiment of a system of a communication equipment with a module for wireless communication and an integrated circuit card device which are connected via an interface for signaling with regard to a routing of an asynchronous event—the module has a terminal controller for connection to a command interface and the equipment appliance has further applications and communication interfaces for wireless communication and wherein the command interface is provided as a unique command interface instance to the ICC-device and the applications.
Figure 3:
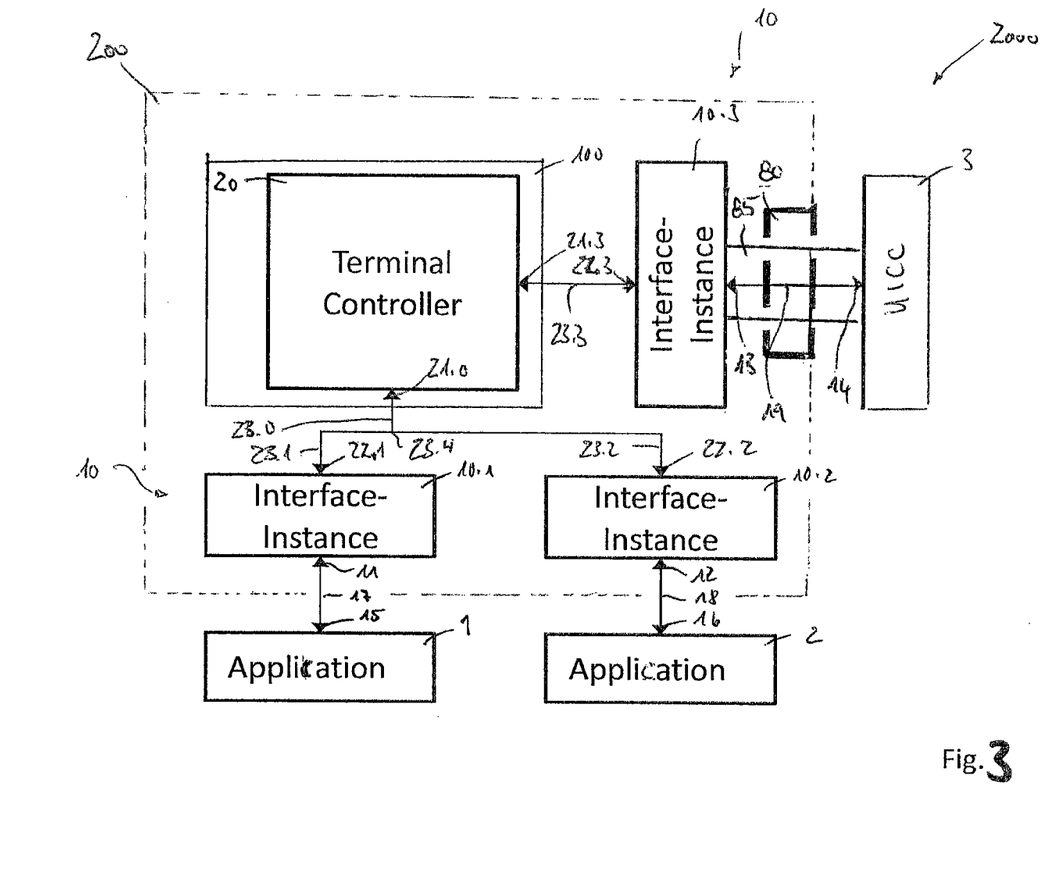
FIG. 3 is a block diagram of a different preferred second variant embodiment of a system of a communication equipment wherein an connection interface is provided as an interface system with a number of interface instances wherein each interface instance is dedicated to the ICC-device and a number of applications respectively.

In detail FIG. 2 shows the communication equipment in this embodiment as a wireless equipment adapted for wireless communication to a cellular radio network RN. The cellular radio network RN is only exemplifying for any kind of communication equipment as is embraced by the claims. In particular the block diagrams depicted in FIG. 2 and FIG. 3 are meant to describe further in a broad range examples of a system 1000, 2000 of a communication equipment and are not restricting to the general concept of the invention—other examples of a communication equipment are for instance a mobile equipment or an M2M equipment.

In the instant example of FIG. 2 the system 1000 is shown in more detail and further comprises an equipment appliance 200 which is adapted to hold the module 100. As shown in detail in FIG. 2, the equipment appliance has an antenna 30, a man machine interface 40, a monitor 50 and a power source 60 like a battery. Further the equipment appliance 200 has several interfaces 70 for physically connecting external devices or networks to the communication equipment.

Also, although not depicted in detail, the module 100 further comprises interfaces and connections, e.g. a bus connection to one or more of the hardware items 30, 40, 50, 60, 70 as outlined above and also further comprises a memory and the like entities of a computing module to allow operation of the communication equipment for wireless communication with a cellular radio network RN.

In turn the interface system 10 has first connection items 11 and 12 for connecting to a second connection item 15, 16 to establish a signaling connection 17, 18 to a first and second application 1, 2 respectively. The command interface also has a first connection item 13 for connection to a second connection item 14 of a unique integrated circuit card device 3 to establish a signaling connection 19 to the UICC-device 3. Further for simplicity in FIG. 2 identical or similar features or features of identical or similar function have been shown with same reference marks. Respective description is given with regard to FIG. 1.

Thus the interface system 10 in form of the command interface is adapted as a unique interface to communicate bidirectional between a first and second application 1, 2 respectively and the command interface but also to a unique integrated circuit card device 3. Signaling may comprise commands, codes and information signaling corresponding to a respective signaling via signaling connection 23 between the terminal controller 20 and the command interface 10. In particular, signaling between a UICC-device 3 and the command interface system 10 is an AT command signaling as further described in detail with regard to FIG. 4. In particular the signaling between the command interface system 10 and the terminal controller 20 is an URC signaling as further described with regard to FIG. 4.

With regard to the functionality in the first embodiment of FIG. 2 the terminal provides an interface system 10 in form of a command interface instance 10.0 which is connected to the terminal controller 20. As outlined the described concept is regardless of a real implementation so all components can be combined in one or more entities. The command interface allows registering of multiple listening entities, so called "listeners", which can be applications 1, 2 or a SIM/UICC device 3, or representatives of them. At start up, in particular subsequent to a terminal profile negotiation procedure, the registration of the UICC or any application is performed. Afterwards the UICC-device 3 and/or application can via AT command inform the command interface 10.0 about the requested URCs. Such requesting of a particular URCs is preferably done via a special command which is related to a certain URC. With such command e.g. in format "AT+CIND=,1" a device, in particular a UICC-device, can switch on or off, if the certain URC is to be sent or not, when the appropriate event is detected within the module. Usually the command has as a parameter the information if the URC request is switched on (parameter value 1 or true), or switched off (value 0 or false, respectively). This is advantageous as with the result provided by the module when receiving this special command, the module can inform the requesting device, if the URC or even this command is supported. Alternatively a generic command can also be provided which expects as a parameter an identifier of a certain URC type and in particular an information if the request for this URC is switched on or off or—as in the example above—in a predefined succession of certain URC types only the Boolean value for switching on or off is provided at the x-th parameter. Such type of generic command is thus configured to provide more than one URC within one command, this is possible for other types of generic commands as well.

For certain events—in particular "Ring"—the module and/or UICC-device is preferably configured to forward resp. expect it without further requesting steps.

Each time an URC occurs in the module 100 with the terminal controller 20 it is provided to the command interface instance 10.0. In the command interface instance 10.0 it is now checked which listeners are available and which URCs are of interest for the listeners. In a simplified variant all URCs that are of interest of at least one listeners are provided to all listeners—this saves resources to store and check the individually requested URCs, but leads to unwanted URCs—or for each listener additionally a list of requested URCs is maintained and as such only the requested URCs are forwarded to the listeners. As such the command interface instance 10.0 has to provide certain complexity within one component, but relieves the terminal controller of further work. For the terminal controller 20 it is not even of interest if any application is registered as listener—all URCs are sent to command interface.

FIG. 3 depicts a modified embodiment of a system 2000 of a communication equipment for operating a module 100 for wireless communication. The module 100 again is implemented in an equipment appliance as has been described with FIG. 2—the equipment appliance 200 is not shown in detail in FIG. 3 but can be applied in a same or similar way; for simplicity also in FIG. 3 identical or similar features or features of identical or similar function have been shown with same reference marks for simplicity. Respective description is given with regard to FIG. 2.

In the instant case the interface system 10 is provided as a system of interface instances 10.1, 10.2, 10.3 for a first and second application 1, 2 respectively and a unique integrated circuit cart device 3 respectively. The interface system 10 with interface instances 10.1, 10.2, 10.3 thus forms an interface system wherein each interface instance 10.1, 10.2, 10.3 is dedicated to the respective application 1, 2 or device 3 respectively. In particular, the application 1 and application 2 functionality of the interface instance 10.1 and interface 10.2 is somewhat according to the same protocol and thus the terminal controller is connected via a unique signaling connection 23.1 to the first interface instance 10.1 and signaling connection 23.2 to the second interface instance 10.2. Accordingly the signaling connection 23.1 has a splitter 23.4 to provide a signaling connection 23.1 to the first interface instance 10.1 and a second signaling connection 23.2 to the second interface instance 10.2. The splitter 23.4 brings together the signaling connections 23.1 and 23.2 to the signaling connection 23.0. In turn the signaling connection 23.0 is connected to the module 100 with the terminal controller 20 via a first connection item 21.0 whereas the signaling connection 23.1 is connected to the first interface instance via a first further connection item 22.1 and the signaling connection 23.2 is connected to the second interface instance 10.2 via a further second connection item 22.2.

In an alternative embodiment the splitter 23.4 also can be omitted; then the first and second signaling connections 23.1 and 23.2 can be guided directly to a first and second signaling connection 21.1, 21.2 at the module 100 with the terminal controller 20 respectively (not shown).

In turn, the interface instance 10.1 and the interface instance 10.2 again are connected to a first application 1 and a second application 2 as described with FIG. 2 in correspondence. In this embodiment of FIG. 3 however, the connection items 11 and 12 do not connect to a unique interface instance 10.0 rather than a separate first interface instance 10.1 and a second interface instance 10.2 of the interface system 10 shown in FIG. 2:

For connecting the module 100 with the terminal controller 20 to the unique integrated circuit card device 3 via the third interface instance 10.3 the terminal controller has a third connection item 21.3 which respectively also is implemented in the module 100. The third connection item 21.3 is connected to a third further connection item 22.3 of the interface instance 10.3 to establish a signaling connection 23.3 between the terminal controller and the third instance 10.3. The signaling connection 23.3 is for signaling of AT-commands on the one hand and URC based signals on the other hand mainly as will be further described with FIG. 4. The third interface instance 10.3 in turn is connected to the unique integrated circuit card device 3 via a signaling connection 19 between a first connection item 13 and a second connection item 14 as has been described in principle with FIG. 2 already. Apart from the physical connection of applications 1, 2 with the module compared to the connection of the UICC-device, the interface instances 10.1, 10.2, 10.3 virtually do not necessarily distinguish what type of application they are connected with. From the perspective of the interface instance each application could be of any type. Moreover the applications 1, 2 can further be of different types as well. Even a second UICC-device or the like could be attached via one of the interface instances to the module.

With regard to the functionality in the second embodiment of FIG. 3 the architecture is somewhat more complex. Here for each connected application/UICC-device a single interface instance 10.1, 10.2, 10.3 is available which each registers at the terminal controller 20 and each serves only one application resp. UICC-device 3. Typically a fixed set of interface instances is available and during start-up all applications when connected get one of them assigned. When the applications/UICC-device provide preferably through AT commands those URCs that the application or UICC-device is interested in, this information is stored as subscribed URCs in the assigned interface instance, or at least a reference to where this information is stored, this process is described in detail below.

When an URC is reported in the terminal controller 20, all instance interfaces get successively or in parallel the URC forwarded. It does not matter in case an interface instance has no application assigned, if it gets informed of URCs by the terminal controller or is deactivated as long it has no assigned application.

As each interface instance 10.1, 10.2, 10.3 has knowledge which URCs are to be forwarded to the assigned application or SIM-device 3, here the filtering is done. If the reported URC matches the list of subscribed URCs, it is forwarded through the standard interface to the assigned application or SIM. Such the SIM connected via CAT interface gets instantly informed e.g. of a high temperature in the terminal or an E-call which is started by another application.

Figure 4:
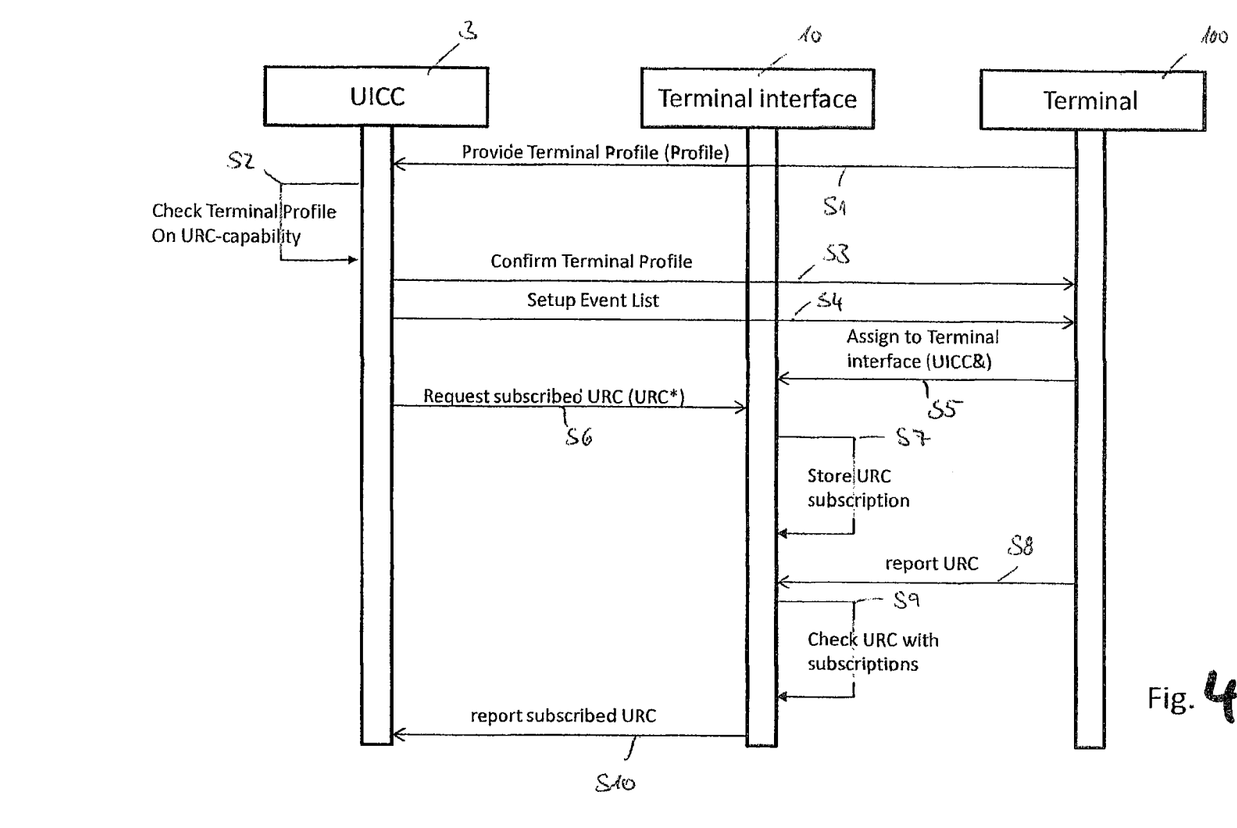
FIG. 4 is a further generalizing schematic view of a system of a communication equipment combined with a flow chart scheme to illustrate a preferred embodiment of a method of operating a module for wireless communication or the like wireless communication terminal and wherein for routing an asynchronous event, operating of the module in relation to a device of an integrated circuit card (UICC) is adapted for signaling between the module and the integrated circuit card device via an interface—the event related communication is based on an unsolicited result code (URC) at least in a downlink sending from the module to the ICC-device.

FIG. 4 depicts a sequence diagram of a method of operating a module 100 for wireless communication wherein the operating of the module 100 is in relation to a device 3 of an integrated circuit card and wherein for routing an asynchronous event that operating is adapted for signaling between the module 100 and the integrated circuit cart device (ICC-device) via an interface 10. As indicated in FIG. 4 the module 100 in principle can be any terminal for wireless communication like for instance a mobile terminal or M2M-terminal; in particular a module of one of the embodiments shown in FIG. 2 and FIG. 3. Further, the interface system 10 can be in a particular preferred manner implemented by means of an unique interface 10, in particular a command interface 10.0 as shown in FIG. 2, or an interface system 10 in form of a system with a number of interface instances 10.1, 10.2 dedicated to a number of applications; in particular an interface instance 10.3 as shown in FIG. 3. As indicated in FIG. 4 also the device 3 can be a unique integrated circuit card device UICC. It is to be understood that the configuration and software and hardware implementation of the module 100, the interface system 10 and the device 3 respectively and in combination is not restricting and the method of operating a module 100 as depicted in FIG. 4 is to be understood in a general way with regard to a broad understanding of a module 100, an interface system 10 and a device 3.

In a first step S1 a profile, in particular a terminal profile, of the module 100 is provided from the module 100 to the device 3 via signaling connection 23, 19 as exemplified in FIG. 2 or signaling connection 23.3, 19 respectively in FIG. 3. This is preferably done by means of a CAT command or event or as response to a CAT command. In a second step S2 the profile is checked at the device 3 with regard to capability of receiving an unsolicited result code signaling (URC-signaling). In a third step S3 the device 3 responds to the module 100—again preferably via signaling connections 19, 23 or 19, 23.3 respectively—with a confirmation. In a further step S4 the device 3 informs the module 100 about the capability to receive a certain asynchronous event and/or other events. In a further step S5 the module 100 assigns to the interface system 10 the device 3 or a representation thereof. This step in particular can also be done in an earlier phase and such all subsequent communication between device 3 and the terminal 100 is managed by the interface system 10. In a further step S6 the device 3 requests a suitable number of URCs to the interface 10; in particular also the module 100 is informed via the interface system 10 (not shown in detail in FIG. 4). Here it should be indicated that each of the steps S3, S4 and S6 further can be provided in form of an AT command. Step S6 can also comprise several separate requests for subscribing to different URCs. In step S7 the request of URC subscription, namely here a certain list of URC types provided to the interface system 10 by the device 3, is stored in the interface 10. From now on the system of the device 3, interface system 10 and terminal 100 is readily initialized to provide operation signaling in between the module 100 and the device 3 via the interface, in particular in downlink sending from the module 100 to the ICC device 3, based on an unsolicited result code.

In detail as exemplified with FIG. 4 in step S8 an URC can be reported in the module 100 to the interface 10. In step S9 it is checked whether the URC reported is in compliance with the list of URCs stored in the interface 10, namely the URCs allowed by the device 3 via a request of subscribed URCs of step S6. In step S10 in the case the checking results in a positive matching the URC is reported as being subscribed to the device.

With regard to the functionality FIG. 4 shows an exemplifying message flow of the setup procedure between an UICC and a module 100 or the like terminal. More specifically in this example the message flow is typical for a wireless module in conjunction with a subscriber identity module. It is assumed that both terminal and UICC are physically connected and capable of communicating via CAT. On start-up, at an early stage of connection or on request the terminal provides in step S1 with CAT command its terminal profile to the UICC. The profile contains a list of CAT facilities that are supported by the terminal (TS 102 223), whereby the profile is currently a 33-byte word, but future standard releases can change this. E.g. in a 32-byte word a couple of bits are unused in current specifications for future facilities, one of these bits can be used to indicate the capability to report URCs. When UICC receives the terminal profile, in step S2 it analyses all capabilities of connected terminal including the capability to report URCs. Preferably in step S3 it responds to the terminal with the confirmation that it understood the terminal profile, in particular that it is able to accept URCs. Further in an additional step a proactive command is returned to the terminal named "Setup Event List", which in step S4 informs the terminal about the capabilities of the UICC to receive certain events. Here the capability to receive URCs can be reported as one parameter. Preferably the URC can be converted in Terminal Interface 10 to a generic CAT-event that is designed to wrap the URC and provide it to the UICC 3.

The terminal can therefore in step S5 assign the UICC or a representation of it to a terminal interface instance like shown in FIG. 1. All following interaction between UICC and terminal is now managed by the terminal interface.

Now the UICC can decide which URCs it is interested in. Typically a predefined set of URC types is already available and with certain AT commands the terminal is informed in step S6 via terminal interface which URCs shall be forwarded to the UICC. For simplicity reasons it is shown as one command which provides a collection of URCs, which could be one alternative possibility as opposed to sending for each requested URC one AT command. Which option is chosen does not make a material difference and is part of the invention. No matter how the URC types are provided they are stored in step S7 in the terminal interface in a list of subscribed URCs.

Should now due to a predefined trigger a certain URC be reported in step S8 in the terminal—e.g. a temperature indicator—it gets forwarded from the terminal to all active terminal interface instances, included that which has the UICC assigned. In the terminal interface instance assigned to UICC it is now in step S9 checked, if URC matches the list of subscribed URCs. If not, the URC is ignored and not forwarded (not shown). If appropriate the terminal can retrieve the information if the URC was forwarded or not. Should the URC match the list of subscribed URCs, the URC in step S10 is forwarded to the UICC through available transmission means as stated above. The UICC now can react appropriately based on the information it gets through the URC, e.g. if the URC indicates a running E-Call, possible own transactions through CAT with the terminal are delayed.

REFERENCE SIGNS

ATC AT command
CAT Card Application Toolkit
PAC Proactive command
RN radio network
S1 . . . S10 method steps
SIM subscriber identity module
UICC Unified Integrated Circuit Card like SIM card
URC Unsolicited Result code
RN radio network
1 first application
2 second application
3 integrated circuit card device
3IC integrated circuit
10 command interface system
10F filter means
10.1, 10.2, 10.3 command interface instance
11, 12, 13, 27 first connection items
15, 16, 17, 28 second connection item
17, 18, 19, 29 signaling connection
20 terminal controller
21 first connection item
21.0 further first connection item
21.3 further third connection item
22 second connection item
22.1 still further first connection item
22.2 still further second connection item
22.3 still further third connection item
23, 23.0 signaling connection
23.1 first signaling connection
23.2 second signaling connection
23.4 splitter for signaling connection
30 antenna
40 man machine interface
50 monitor
60 power source
70 physical interfaces
80 card application toolkit
85 code interface
100 module or the like terminal
200 equipment appliance
1000, 2000 system of a communication equipment

What is claimed is:

1. A method of operating a module for wireless communication, wherein in operation the module is in signaling relation to a device of an integrated circuit card, wherein
said operation is adapted for signaling between the module and the integrated circuit card device via an interface system, said interface system comprising:
at least one command interface instance adapted for direct command signaling between the module and at least one application, and
a card application toolkit for direct command signaling between the module and the integrated circuit card device, characterized in that
an asynchronous event related communication between the module and the integrated circuit card device is provided in a downlink signaling from the module to the integrated circuit card device, wherein
for routing said asynchronous event in the downlink signaling from the module to the integrated circuit card device a code, in particular a URC-Code, is sent from the command interface instance, in particular an AT interface, to the integrated circuit card device.

2. The method as claimed in claim 1, characterized in that the code is passed in formatted form to the integrated circuit card device, in particular wherein the card application toolkit provides a code interface for transforming the code.

3. The method as claimed in claim 1, characterized in that the asynchronous event is generated by means of a module or an appliance, and wherein the asynchronous event is initiated by a command signaling from the module or the appliance and is provided to said command interface instance.

4. The method as claimed in claim 1, characterized in that the asynchronous event related communication is provided between a terminal controller of the module and an integrated circuit of the integrated circuit card device wherein the code, in particular an unsolicited result code, is filtered by a filter means of the command interface system, in particular of an interface instance.

5. The method as claimed in claim 1, characterized in that for filtering by the interface system a filter means is provided in an interface instance, and wherein
- in a first step the integrated circuit card device and the module are assigned relative to each other with a terminal profile; and/or
- in a second step a plurality of unsolicited result codes is subscribed to the interface system, in particular stored in the filter means, wherein the plurality of unsolicited result codes is adapted to the terminal profile; and/or
- in a third step a reported unsolicited result code is probed in compliance with the subscribed plurality of unsolicited result codes.

6. The method as claimed in claim 1, characterized in that the asynchronous event related communication between the module and the integrated circuit card device is based on a code in form of an unsolicited result code which comprises a text string, in particular a text string comprising an identifier which is definable by the module.

7. The method as claimed in claim 1, characterized in that the asynchronous event related communication between the module and the integrated circuit card device is in a downlink sending from the module to the integrated circuit card device to report a module status and/or a terminal profile information wherein a command facility is adapted to generate one or more signaling items of a group, in particular wherein the items are selected from the group comprising: a request for battery charge status, an indication of a ringtone activation, an indication of a temperature status, voltage or field strength status at an antenna of an equipment appliance or other antenna status, an indication of antenna status, an indication of actual call situation, an indication of communication-link-stability or an indication of audio activities, or another indication of applications on the equipment appliance.

8. The method as claimed in claim 1, characterized in that the event related communication between a terminal controller of the module and an integrated circuit of the integrated circuit card device is in an uplink sending settable by means of an AT-command request, in particular for setting a terminal profile and/or a setup event list and/or for requesting at least one unsolicited result code.

9. A module for wireless communication, wherein the module is adapted for operating in relation to a device of an integrated circuit card, characterized in that
said operation is adapted for signaling via an interface system between the module and the integrated circuit card device as claimed in claim 1.

10. A device of an integrated circuit card, in particular integrated circuit card with said device, wherein the device is adapted for operating in relation to a module for wireless communication, characterized in that said operation is adapted for signaling via an interface system between the module and the integrated circuit card device as claimed in claim 1.

11. A system of a communication equipment, in particular a wireless equipment or mobile equipment or an M2M-equipment, for operating a module for wireless communication, wherein the system comprises:
- an equipment appliance;
- an integrated circuit card device; in particular a device of an universal integrated circuit card and/or a SIM-card, in particular implemented in the equipment appliance as a software or hardware card unit, and
- the module for wireless communication,
- an interface system for signaling between the module and the integrated circuit card device when in operation, said interface system comprising:
  - at least one command interface instance adapted for direct command signaling between the module and at least one application, and
  - a card application toolkit for direct command signaling between the module and the integrated circuit card device characterized in that
the interface system is adapted for an asynchronous event related communication between the module and the integrated circuit card device such that for routing an asynchronous event in the downlink signaling from the module to the integrated circuit card device
- a code, in particular a URC-Code, can be sent from the command interface instance, in particular an AT interface, to the integrated circuit card device.

12. The system as claimed in claim 11, characterized in that the card application toolkit provides a code interface for transforming the code such that the code can be passed in formatted form to the integrated circuit card device, wherein in particular the application toolkit has an AT-command dedicated unit and an URC-command dedicated unit, in particular the toolkit is formed as an extended card application toolkit (CAT).

13. A system as claimed in claim 11, characterized in that the integrated circuit card is inserted as a hardware card unit into the equipment appliance of the communication equipment or installed as a software card unit in a memory and/or logic of the equipment appliance, in particular the module, in particular wherein the communication equipment has a terminal controller signaling connected to the device via the interface system, preferably a terminal controller implemented in the equipment appliance and/or the module.

14. The system as claimed in claim 13, characterized in that the terminal controller is signaling connected commonly via a unique command interface instance of the interface system to the integrated circuit card device and to at least one further application.

15. The system as claimed in claim 14, characterized in that the terminal controller is dedicatedly signaling separately connected to the integrated circuit card device and at least one further application via a number of different interface instances of the interface system to the integrated circuit card device and to at least one further application.

16. The system as claimed in claim 11, characterized in that the interface system has a number of command interface instances, in particular one or at least a first and a second command interface instance, in particular wherein at least one of the command interface instances is formed by or connected to the card application toolkit, in particular an extended standard application toolkit.

* * * * *